United States Patent
Frunzar

Patent Number: 5,152,494
Date of Patent: Oct. 6, 1992

[54] APPARATUS FOR PROTECTING FISHING RODS

[76] Inventor: John Frunzar, 8915 Carleto Ct., Charlotte, N.C. 28214

[21] Appl. No.: 879,080

[22] Filed: May 1, 1992

Related U.S. Application Data

[63] Continuation-in-part of Ser. No. 670,577, Mar. 18, 1991, abandoned.

[51] Int. Cl.$^5$ .............................................. A01K 97/00
[52] U.S. Cl. .................................. 248/513; 248/514; 248/518; 248/538; 43/21.2
[58] Field of Search ............... 248/513, 512, 514, 518, 248/538, 519, 520, 205.2, 456; 43/21.2

[56] References Cited

U.S. PATENT DOCUMENTS

| | | | |
|---|---|---|---|
| 1,580,344 | 4/1926 | Stillians | 248/456 |
| 1,776,425 | 9/1930 | Geisinger | 248/514 |
| 2,017,518 | 10/1935 | Wagner | 248/456 |
| 2,454,458 | 11/1948 | Kaetker | 248/514 |
| 2,674,426 | 4/1954 | Hiles | 248/518 |
| 2,973,929 | 3/1961 | Zawadzki | 248/513 |
| 3,159,366 | 12/1964 | Knight | 43/21.2 X |
| 3,701,504 | 10/1972 | Woods et al. | 248/513 |
| 4,044,980 | 8/1977 | Cummins | 248/456 X |
| 4,133,131 | 1/1979 | Davy | 43/21.2 |
| 4,479,322 | 10/1984 | Koppel | 248/513 X |
| 4,523,403 | 6/1985 | Ivy et al. | 43/21.2 X |
| 4,676,019 | 6/1987 | Engles | 43/21.2 |
| 4,759,963 | 7/1988 | Uso, Jr. et al. | 248/205.2 X |

Primary Examiner—David L. Talbott
Attorney, Agent, or Firm—Clifton Ted Hunt

[57] ABSTRACT

Apparatus for protecting a plurality of fishing rods to be selectively used while fishing from a boat in different locations, as in tournament fishing. The apparatus has a rod holding plate, a support arm pivotally interconnected with the rod holding plate and the rod holding plate having a series of longitudinally spaced slots extending transversely of the rod holding plate. A tongue extends from the support arm and penetrates a selected slot to support the rod holding plate at a selected angle, and a keeper engages the tongue to keep the tongue in the selected slot. The fishing rods are releasably held on said rod holding plate.

9 Claims, 3 Drawing Sheets

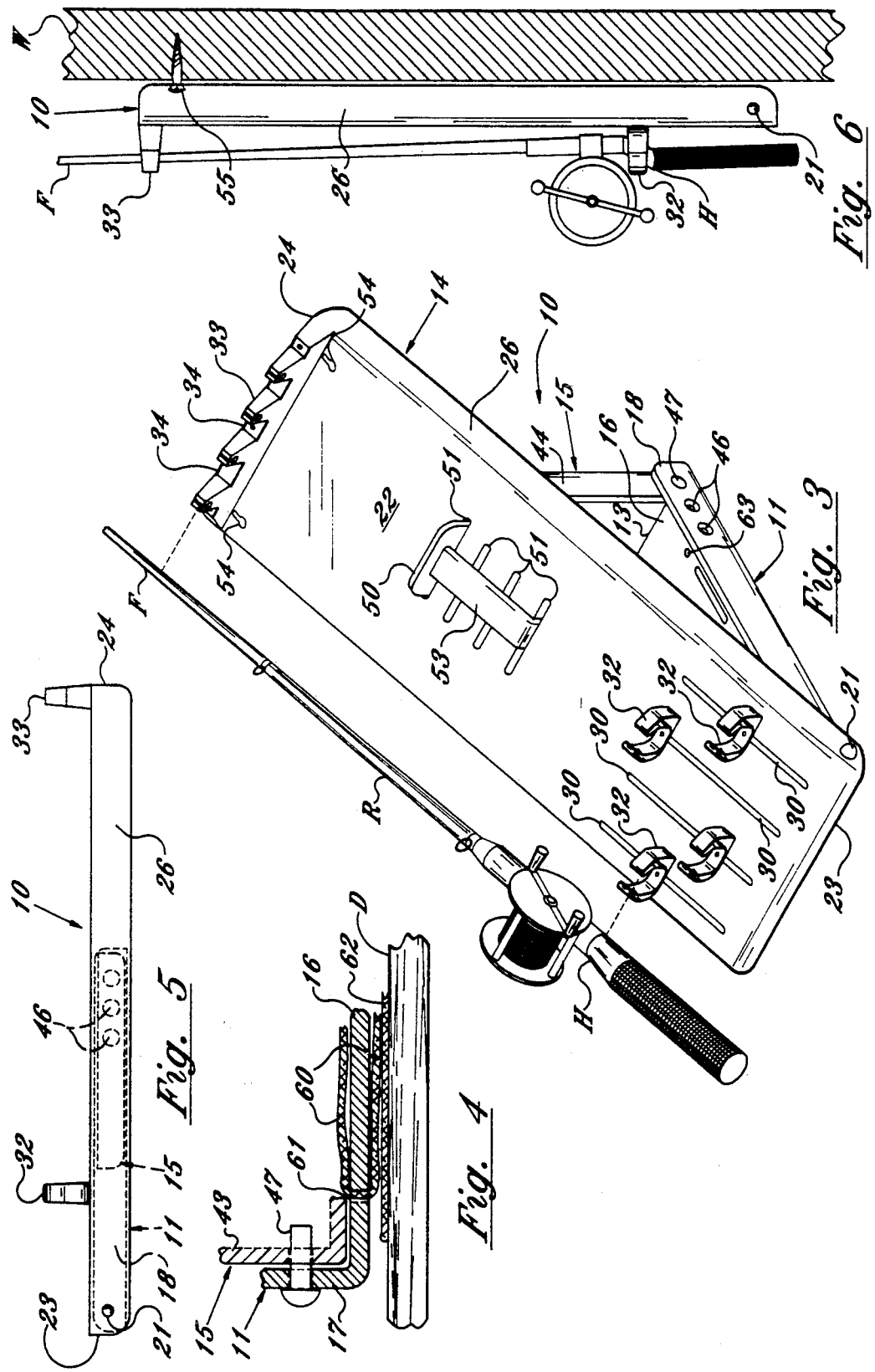

APPARATUS FOR PROTECTING FISHING RODS

CROSS REFERENCE TO RELATED APPLICATION

This application is a continuation-in-part of my copending application Ser. No. 670,577, filed Mar. 18, 1991 for FISHING ROD HOLDER now abandoned.

FIELD OF THE INVENTION

This invention relates to the protection of a plurality of inactive fishing rods in position to be grasped and activated when desired; while being transported for fishing; and while in storage.

BACKGROUND OF THE INVENTION

There are devices for supporting fishing rods while fishing and there are devices for protecting fishing rods in storage. The following patents are representative of the known prior art:

| U.S. PAT. NO. | ISSUE DATE | INVENTOR | TITLE |
| --- | --- | --- | --- |
| 358,527 | Mar 1, 1887 | Zwoyer | FISHERMAN's POLE REST |
| 420,592 | Feb 4, 1890 | Dayton | REST FOR FISHING RODS |
| 704,991 | July 15, 1902 | Warren | FISHING ROD HOLDER |
| 1,025,657 | May 7, 1912 | Towne | FISH ROD HOLDER |
| 1,283,511 | Nov 5, 1918 | Heidtmann | FISHING ROD HOLDER |
| 1,719,695 | July 2, 1919 | Ferguson | FISHING ROD SUPPORT |
| 1,776,425 | Sep 23, 1930 | Geisinger | COLLAPSIBLE POLE AND ROD HOLDER |
| 2,099,254 | Nov 16, 1937 | Ballman | FISHING ROD HOLDER |
| 2,454,458 | Nov 23, 1948 | Kaetker | FISHING POLE HOLDER |
| 2,540,584 | Feb 6, 1951 | Jaycox | TROLLING FIXTURE |
| 2,674,426 | Apr 6, 1954 | Hiles | FISHING ROD HOLDER WITH FOLDABLE PROP |
| 4,424,907 | Jan 10, 1984 | Robb | FISHING TACKLE STORAGE RACK |
| 4,133,131 | Jan 9, 1979 | Davy | FISHING ROD STORAGE AND SUPPORT APPARATUS |
| 4,759,963 | July 26, 1988 | Uso, Jr. | FISHING POLE FASTENING DEVICE |
| 4,841,660 | June 27, 1989 | James | FISHING ROD HOLDER |
| 4,876,980 | Oct 31, 1989 | Bell, III | FISHING ROD HOLDER EXTENSION |
| 4,881,674 | Nov 21, 1989 | Medianik | FISHING ROD HOLDER |

None of the foregoing patents relate to the protection of a plurality of fishing rods while fishing. The utility of the storage racks shown in U.S. Pat. No. 4,424,907 to Robb and U.S. Pat. No. 4,881,674 to Medianik is limited to protecting fishing rods in dead storage. They teach nothing about the protection of inactive rods while supporting them in position to be readily available when needed. James teaches only that a tackle box may support one or more rods while fishing.

SUMMARY OF THE INVENTION

The protective apparatus of the present invention offers the user more options for utility than have been heretofore known in the art. It will support and protect a plurality of fishing rods in many environments, including storage, transit, and active fishing, but is particularly adapted for protecting a plurality of inactive fishing rods while supporting them in position to be readily grasped and activated during tournament fishing.

Tournament fishing, as for bass, is a competition where a number of registered contestants fish in a large area from individual boats capable of reaching high speeds. The object is to catch more fish than other contestants within a designated period of time. Each contestant carries a plurality of fishing rods, each baited with a different lure to be used in different environments and under different conditions. The contestants may use their boats to fish anywhere within the designated area and they rely on the speed of their boats to get from one location to another as quickly as possible so as to have as much time as possible for fishing instead of traveling between locations. The boats sometimes reach speeds in excess of fifty miles per hour, which subjects the boat and all of its contents to violent pounding.

The fishing rods carried on each boat must be secured to keep from losing them. At the same time, it is desirable to have the fishing rods readily available for instant use when arriving at a new location. The protective apparatus of the present invention is intended to fulfill the double function of protecting the rods in transit from location to location while supporting the rods in position to be readily available for instant use when arriving at a new location.

The apparatus of the present invention generally comprises a base, a rod holding plate pivotally connected to one end of the base, and an angularly adjustable support arm pivotally connected to the other end of the base. The base may be temporarily attached or permanently fastened in substantially parallel relation to a supporting surface and the rod holding plate and support arm angularly adjusted relative to the base and to each other to support one or more fishing rods at a selected angle while being actively used for fishing, and to support and protect a plurality of inactive fishing rods in position to be readily grasped and actively used for fishing. As previously noted the utility of the protective apparatus of this invention also extends to protecting the plurality of fishing rods in transit by automotive vehicle or boat, and to protecting a plurality of fishing rods in dead storage.

BRIEF DESCRIPTION OF THE DRAWINGS

FIG. 3 is a perspective view of the fishing rod holding plate fastened at a selected angle to protect the rods in position to be grasped and used for tournament fishing;

FIG. 4 is a sectional view taken substantially along the line 4—4 in FIG. 2;

FIG. 5 is a side view of the apparatus adjusted to a flat compact unit for transportation or for dead storage of fishing rods; and FIG. 6 is a side view of the apparatus adjusted to the position of FIG. 5 and hung on a wall for the storage of fishing rods.

DETAILED DESCRIPTION OF THE INVENTION

Figure 1:
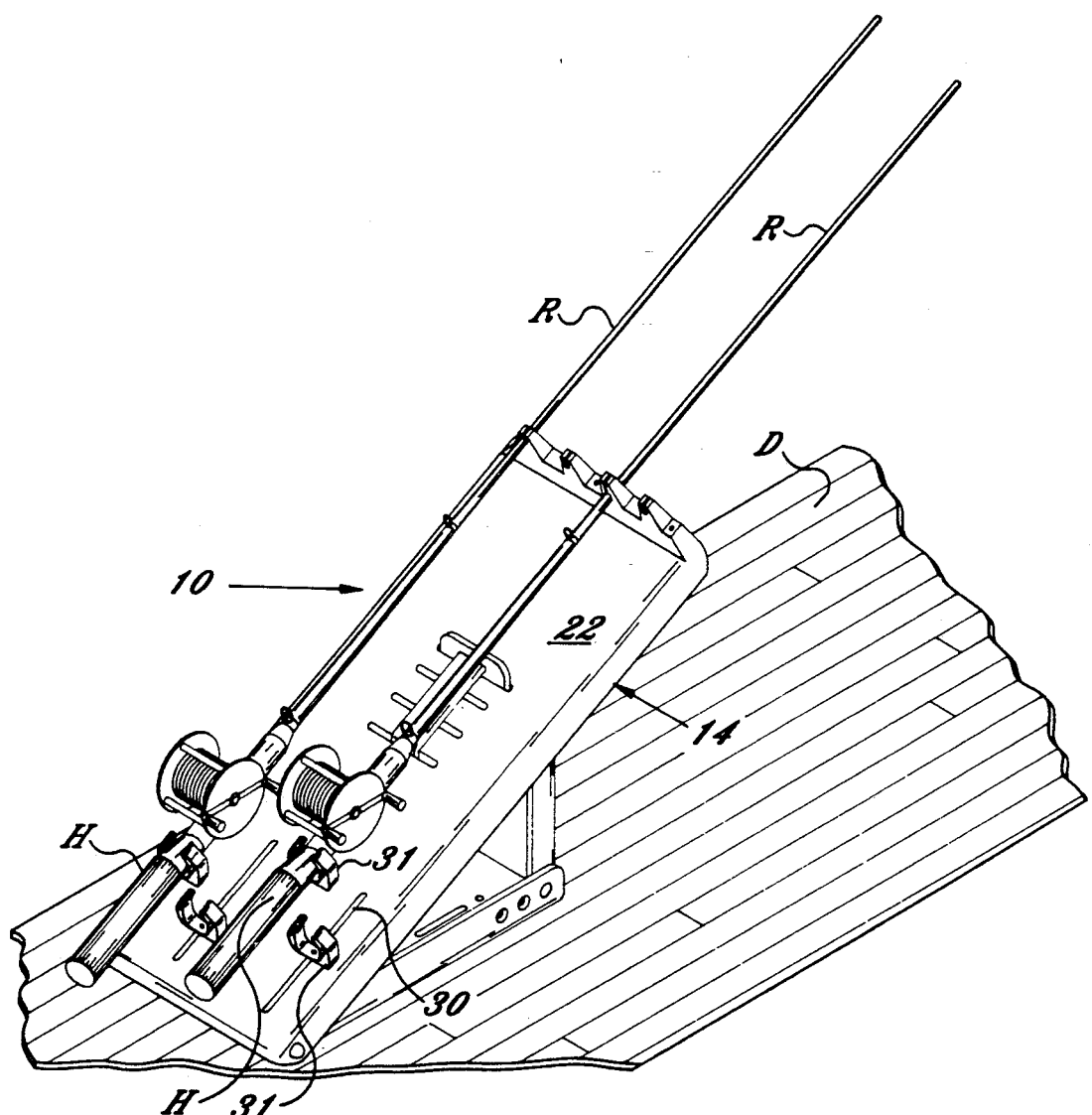
FIG. 1 is a perspective view of the protective apparatus mounted on the deck of a boat and adjusted to support a plurality of fishing rods at a selected angle.

Referring more specifically to the drawings, the apparatus of this invention is broadly designated at 10. The apparatus 10 comprises a base 11 pivotally connected at its end 12 with a rod holding plate 14 and at its end 13 with a support arm 15. These components are preferably molded from a suitable plastic, but may be made of any desired material.

The base 11 includes a generally planar body portion 16 with flanges 17 and 18 extending perpendicularly from its sides. The flanges 17 and 18 have opposed openings 20 near the end 12 of the base to receive a pin 21 for connecting the rod holding plate 14 to the base.

The rod holding plate 14 includes a generally planar body portion 22 with ends 23 and 24 and flanges 25 and 26 extending perpendicularly from its sides. The flanges 25 and 26 have opposed openings 27 near the end 23 of the plate 14 to receive the pin 21 which connects the rod holding plate 14 to the base 11.

The rod holding plate 14 has a plurality of transversely spaced slots 30 extending longitudinally of the plate 14 from points 31 near the end 23 of the plate. A U-shaped resilient grip 32 is adjustably mounted in each slot 30 to receive and support the handle portion H of a fishing rod R. The grips 32 are movable along their respective slots 30 to offset the reel on each rod from the reels on adjoining rods. Also, fishing rods of different lengths may be easily and conveniently supported in the same fishing rod holder 10.

The other or free ends F of the fishing rods R are supported at the end 24 of the rod holder plate 14 in a notched retainer 33, there being a notch 34 for each rod R. The apparatus 10 is illustrated as being built to hold four fishing rods but it is intended that it accomodate any desired number of rods.

The support arm 15 includes a generally planar body portion 40 with ends 41 and 42 and flanges 43 and 44 extending perpendicularly from its sides. The flanges 43 and 44 have opposed openings 45 near the end 41 of the support arm. The openings 45 register with a selected pair of a series of longitudinally spaced and opposed openings 46 extending inwardly along the flanges 17, 18 from the end 13 of the base 11. Pins 47 extend through registered openings 45 and 46 to connect the support arm 15 to the base 11.

Figure 2:
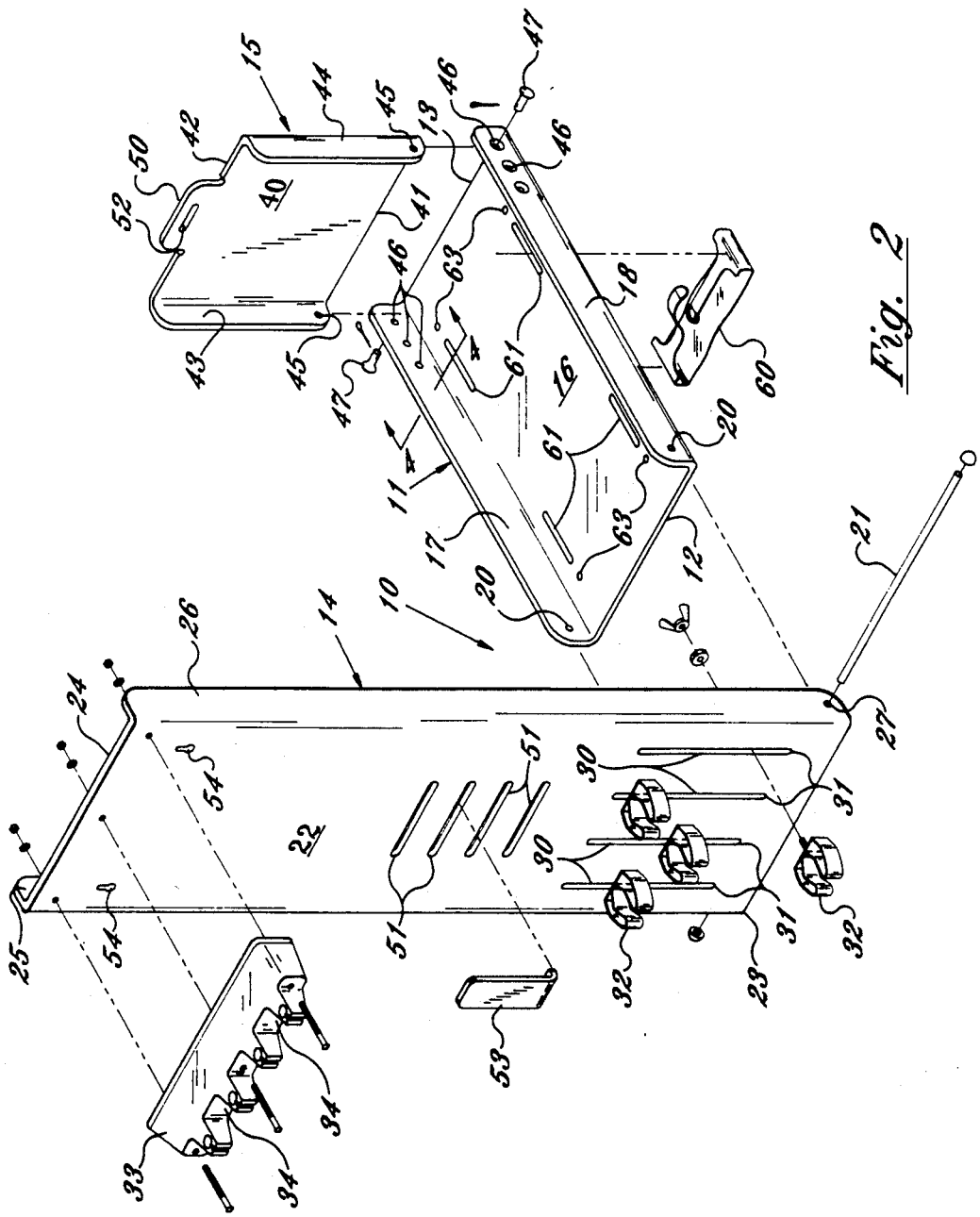
FIG. 2 is an exploded perspective view of the components of the protective apparatus positioned for assembly.

A tongue 50 extends beyond the medial portion of the end 42 of the support arm 15. The tongue 50 registers with a selected one of a plurality of longitudinally spaced slots 51 extending transversely through the medial portion of the body 22 of the rod holding plate 14. The tongue 50 is slotted as at 52 to receive a keeper 53 which retains the tongue in a selected slot 51. As best seen in FIGS. 2 and 3, the keeper 53 is L-shaped. One leg of the keeper penetrates the tongue 50 and the other leg of the keeper penetrates a selected slot 51 to fasten the tongue in place and thereby maintain the rod holding plate 14 and the fishing rods supported thereby at a selected angle despite the buffeting of the boat during high speeds.

The apparatus 10 may be folded into a compact unit for carrying, as shown in FIG. 5, by first pivoting the support arm 15 about the pins 47 to bring the body portion 40 of the support arm into superposed relation to the body portion 16 of the base 11, with the flanges 43, 44 of the support arm extending in inwardly spaced juxtaposition to the flanges 17, 18 of the base 11. The rod holding plate 14 is then pivoted about the pin 21 to bring the body portion 22 of the plate 14 into superposed relation to both the body portion 40 of the support arm 15 and the body portion 16 of the base 11, with the flanges 25, 26 of the rod holding plate 14 extending in outwardly spaced juxtaposition to the flanges 17, 18 of the base 11.

As shown in FIG. 6, the fishing rod holder 10 may function as permanent storge for fishing rods not in use when the components 11, 14, and 15 of the holder 10 are folded into the compact configuration of FIG. 5. For this purpose, the body portion 22 of the rod holding plate 14 has openings 54 spaced inwardly from the end 24 of the plate 14 to receive fastening screws, such as indicated at 55 in FIG. 6, to fasten the fishing rod holder 10 to a wall W or other desired supporting surface.

As best shown in FIGS. 1 and 3, the apparatus 10 is specifically adapted to be folded into a selected angular position and support a plurality of fishing rods at a selected angle while tournament fishing. The apparatus 10 is easily erected from the passive or inactive position of FIG. 5 to the active position of FIGS. 1 and 3 by first pivoting the rod holding plate 14 about the pin 21 to elevate the end 24 of the rod holding plate 14 above the base 11. The support arm 15 is then pivoted about the pins 47 to elevate the end 42 of the support arm 15 above the base 11.

The base 11 is generally supported on a substantially horizontal surface, such as the deck D of a boat or dock (FIG. 4). The angularity of the rod holder plate 14 and its support arm 15 relative to the base 11 is adjustable by use of the series of openings 46 in the flanges of the base 11 and the series of slots 51 in the body of the rod holding plate 14.

The angle at which the support arm 15 intersects the plate 14 determines the angularity of the rod holding plate relative to the base and the angularity of the fishing rods held on the plate 14. The steepest angle is provided by using the innermost pair of openings 46 to connect the support arm to the base with the pins 47, and positioning the tongue 50 through the slot 51 closest to the grips 32. The angularity of the plate relative to the base may be lessened by keeping the pin 47 in the innermost pair of openings 46 and moving the tongue 50 into the slots 51 further away from the grips 32. The biggest decrease in the angularity of the rod holding plate relative to the base is obtained by using the outermost pair of openings in the flanges of the base to connect the support arm to the base, and positioning the tongue of the support arm through the slot furthest from the grips 32 on the base 11.

The apparatus 10 may be temporarily stabilized while fishing by extending one element 60 of a hook and loop fastener transversely across the lower surface of the body 16 of base 11 and through a pair of slots 61 near the end 13 of the body 16 (FIGS. 2 and 4). The element 60 of the hook and loop fastener is formed with a strap and buckle that extends across the upper surface of the body 16 of base 11. The other element 62 of the hook and loop fastener is fastened to the deck or other supporting surface D, as by adhesive.

An element of hook and loop fastener (not shown), corresponding to element 60, may extend similarly through the slots 61 near the end 12 of body 16 for additional stability.

Alternatively, the fishing rod holder 10 may be stabilized while fishing by fastening the base 11 to a supporting surface, such as the boat deck D, with screws (not shown) penetrating openings 63 provided in the base 11 for that purpose.

There is thus provided a apparatus which is readily adaptable to either an active or inactive configuration and which may be easily and quickly adjusted to support fishing rods at a selected angle while tournament fishing.

Although specific terms have been used in describing the invention, they have been used in a generic and descriptive sense only and not for the purpose of limitation.

I claim:

1. Apparatus for protecting a plurality of fishing rods to be selectively used while fishing from a boat in different locations, said apparatus having a rod holding plate, a support arm and means pivotally interconnecting the rod holding plate and support arm for selective support of the rod holding plate in different angular positions, wherein the improvement comprises the rod holding plate having a series of longitudinally spaced slots extending transversely of the rod holding plate, a tongue extending from the support arm for penetrating a selected slot to support the rod holding plate at a selected angle, a keeper engaging the tongue to keep the tongue in a selected slot, and means for releasably holding the fishing rods on said rod holding plate.

2. Apparatus according to claim 1 wherein the tongue has a slot and the keeper is an L-shaped member with one leg being engageable with the slot in the tongue and the other leg of the keeper being engageable with a selected slot in the rod holding plate.

3. Apparatus according to claim 1 wherein the means pivotally interconnecting the rod holding plate and support arm consists of flanges extending perpendicularly from the rod holding plate and support arm in at least partial juxtaposition to each other, and pins penetrating juxtaposed portions of the flanges on the rod holding plate and support arm.

4. Apparatus according to claim 1 wherein the apparatus includes a base and means for releasably attaching the base to a supporting structure to stabilize the apparatus while fishing.

5. Apparatus according to claim 4 wherein said means for releasably attaching the base to the supporting structure comprise the base having openings to be penetrated by headed screws threadably engaging the supporting structure, whereby the apparatus is stabilized.

6. Apparatus according to claim 4 wherein the means for stabilizing the apparatus comprises hook and loop fasteners operatively connected to the base and to the supporting structure.

7. Apparatus according to claim 1 wherein the means for releasably holding the fishing rods on the rod holding plate comprise resilient grips for the handles of the fishing rods and a notched retainer for the free ends of the fishing rods.

8. Apparatus according to claim 7 wherein the rod holding plate has a longitudinally extending slot for each of the resilient grips, whereby each resilient grip may be positioned in its slot so that the reel on the fishing rod held by that resilient grip is offset relative to the reels on fishing rods held by adjoining resilient grips.

9. Apparatus according to claim 4 wherein the means for varying the angularity of the rod holding plate relative to the base comprises means for varying the angular disposition of the support arm relative to the rod holding plate.

* * * * *